(12) United States Patent
Yu et al.

(10) Patent No.: US 8,971,666 B2
(45) Date of Patent: Mar. 3, 2015

(54) FISHEYE CORRECTION WITH PERSPECTIVE DISTORTION REDUCTION METHOD AND RELATED IMAGE PROCESSOR

(75) Inventors: Chi-Chang Yu, Keelung (TW); Ming-Yang Wu, Keelung (TW); Brian Sung, Taipei (TW)

(73) Assignee: Avisonic Technology Corporation, Science-Based Industrial Park, Hsin-Chu (TW)

( * ) Notice: Subject to any disclaimer, the term of this patent is extended or adjusted under 35 U.S.C. 154(b) by 1421 days.

(21) Appl. No.: 12/428,478

(22) Filed: Apr. 23, 2009

(65) Prior Publication Data
US 2010/0119172 A1   May 13, 2010

(30) Foreign Application Priority Data

Nov. 12, 2008  (TW) ............................... 97143649 A

(51) Int. Cl.
*G06K 9/32* (2006.01)
*G06T 3/00* (2006.01)
*G06T 5/00* (2006.01)

(52) U.S. Cl.
CPC .............. *G06T 3/0018* (2013.01); *G06T 5/006* (2013.01)
USPC ......................................... 382/293; 382/275

(58) Field of Classification Search
USPC .................................................. 382/275, 293
See application file for complete search history.

(56) References Cited

U.S. PATENT DOCUMENTS

2007/0171288 A1 * 7/2007 Inoue et al. .................... 348/241

OTHER PUBLICATIONS

Linda Shapiro and George Stockman, Computer Vision, Prentice Hall 2001.*

* cited by examiner

*Primary Examiner* — Chan Park
*Assistant Examiner* — Mark Roz
(74) *Attorney, Agent, or Firm* — Winston Hsu; Scott Margo

(57) ABSTRACT

A fisheye correction with perspective distortion reduction method used for saving memory space and reducing perspective distortion includes a coordinate transformation function, a fisheye distorted image and a fisheye corrected image, the fisheye corrected image includes a plurality of pixels, for each pixel of the plurality of pixels, orderly calculating a coordinate value in the fisheye distorted image, and according to the coordinate value, calculating a pixel value of the fisheye corrected image via an interpolation method, wherein the coordinate transformation function includes a fisheye correction coordinate transformation, a perspective distortion reduction coordinate transformation and an image crop and scale coordinate transformation.

12 Claims, 14 Drawing Sheets
(9 of 14 Drawing Sheet(s) Filed in Color)

FISHEYE CORRECTION WITH PERSPECTIVE DISTORTION REDUCTION METHOD AND RELATED IMAGE PROCESSOR

BACKGROUND OF THE INVENTION

1. Field of the Invention

The present invention relates to a fisheye correction method and related image processor, and more particularly to a fisheye correction method and the related processor for saving memory space, reducing perspective distortion and allowing user's intervention during the fisheye image restoring process.

2. Description of the Prior Art

As the digital image processing technology improves, the images taken by fisheye cameras has been able to be processed in real time, and presented to the user instantly such that the user can interpret the image contents for various purposes. For example, in applications like the back up camera in a car rear view system, the door phone system of a building and the surveillance camera in a security system, the fisheye cameras and the associated image processing system are getting more widely used. Besides that, images taken by a fisheye camera and stored in the digital storage devices can also be retrieved, processed, restored by a similar method, and then presented to the user.

Since a fisheye camera can collect a large viewing angle of image information, the picture taken by the fisheye camera has been distorted and squeezed such that the ordinary user is often being confused while reading the fisheye distorted image, and the contents of the image are hard to interpret correctly. If the fisheye distorted image is not processed properly before presented to the user, it is also possible for an ordinary user to miss important information in the image. Therefore, having a digital image processing device to have the fisheye distorted images restored before they can be presented to the user becomes the most widely accepted solution.

However, the fisheye image restoring method of the prior art needs large memory space to store the intermediate results. Therefore, the cost for realizing the image processing device is relatively high. Meanwhile, the restored image of the prior art suffers from perspective distortion, which introduced problems of non-uniformity of the object size in the picture, and can increase the difficulties of interpreting the images.

SUMMARY OF THE INVENTION

It is therefore a primary object of the claimed invention to provide a fisheye correction with perspective distortion reduction method and related device for saving memory space and reducing perspective distortion.

The present invention discloses a fisheye correction with perspective distortion reduction method for saving memory space and reducing perspective distortion which comprises calculating a coordinate for each pixel of a first plurality of pixels in the fisheye distorted image according to a coordinate transformation function between a fisheye distorted image and a fisheye corrected image, which comprises a second plurality of pixels, and calculating the pixel value of the pixel in the fisheye corrected image via an interpolation method according to the coordinate in the fisheye distorted image, wherein the coordinate transformation function includes a fisheye correction coordinate transformation, a perspective distortion reduction coordinate transformation and an image crop and scale coordinate transformation.

The present invention also discloses a fisheye correction with perspective distortion reduction fisheye image processing device used for saving memory space and reducing perspective distortion, which comprises a coordinate computation unit for calculating a coordinate for each pixel of a first plurality of pixels in the fisheye distorted image according to a coordinate transformation function between a fisheye distorted image and a fisheye corrected image, which comprises a second plurality of pixels, and an image computation unit for calculating the pixel value of the pixel in the fisheye corrected image via an interpolation method according to the coordinate in the fisheye distorted image, wherein the coordinate transformation function includes a fisheye correction coordinate transformation, a perspective distortion reduction coordinate transformation and an image crop and scale coordinate transformation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present invention uses a coordinate transformation between a fisheye corrected image and a fisheye distorted image to calculate the pixel value of a selected pixel in the fisheye corrected image. The present invention uses a one-pass type of fisheye image restoration method to save the memory space and reduce the perspective distortion. The working principle and components for realization of this fisheye image processing method is stated as follows.

Figure 1:
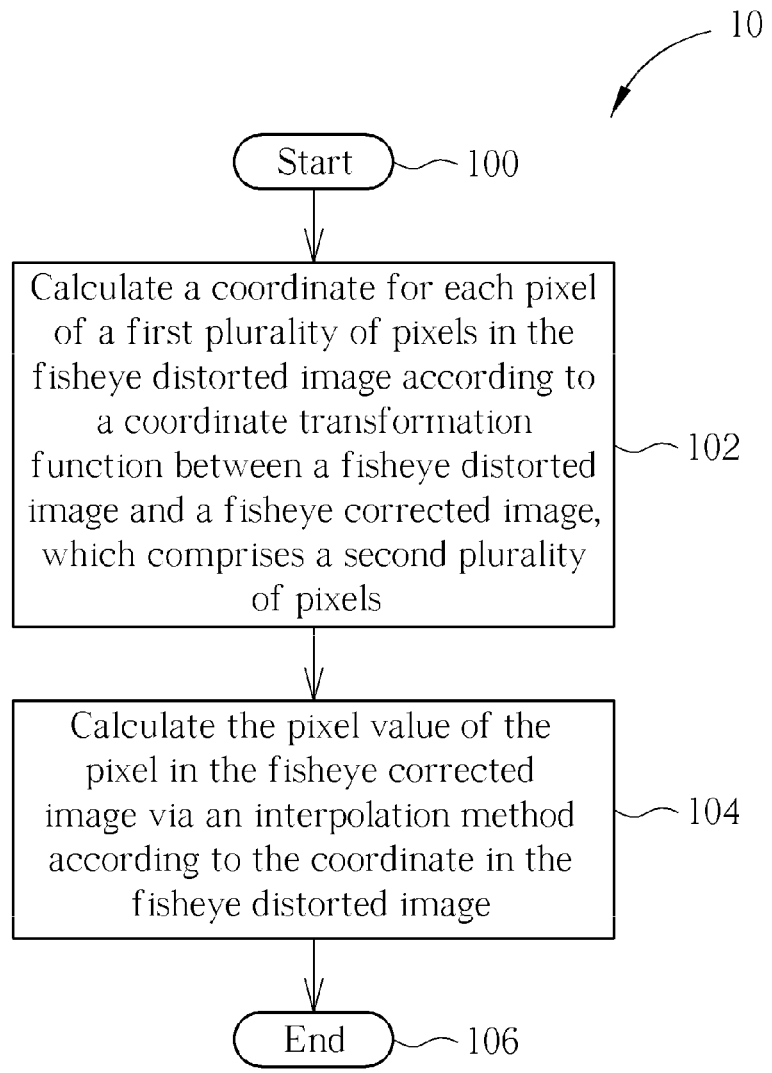
FIG. 1 illustrates a schematic diagram of a flowchart of the embodiment of the present invention.

About the operational procedure for the fisheye image processing method of the present invention, please refer to FIG. 1, which illustrates a schematic diagram of a flowchart 10 of an embodiment of the present invention. The process 10 comprises the following steps:

Step 100: Start.

Step 102: Calculate a coordinate for each pixel of a first plurality of pixels in the fisheye distorted image according to a coordinate transformation function between a fisheye distorted image and a fisheye corrected image, which comprises a second plurality of pixels.

Step 104: Calculate the pixel value of the pixel in the fisheye corrected image via an interpolation method according to the coordinate in the fisheye distorted image.

Step 106: End.

Simply speaking, the process 10 is to take the two-dimensional coordinate of a pixel in the fisheye corrected image, and to calculate the coordinate of the corresponding pixel in the fisheye distorted image and according to the calculated coordinate in the fisheye distorted image, estimate a pixel value of the pixel in the fisheye corrected image by an interpolation method. Besides this, according to the present invention, the coordinate transformation function includes a fisheye correction coordinate transformation, a perspective distortion reduction coordinate transformation and an image crop and scale coordinate transformation. On the other hand, the process 10 can generate a fisheye corrected image with reduced perspective distortion and changeable resolution (or aspect ratio) to fit different kinds of display device.

Figure 2A:
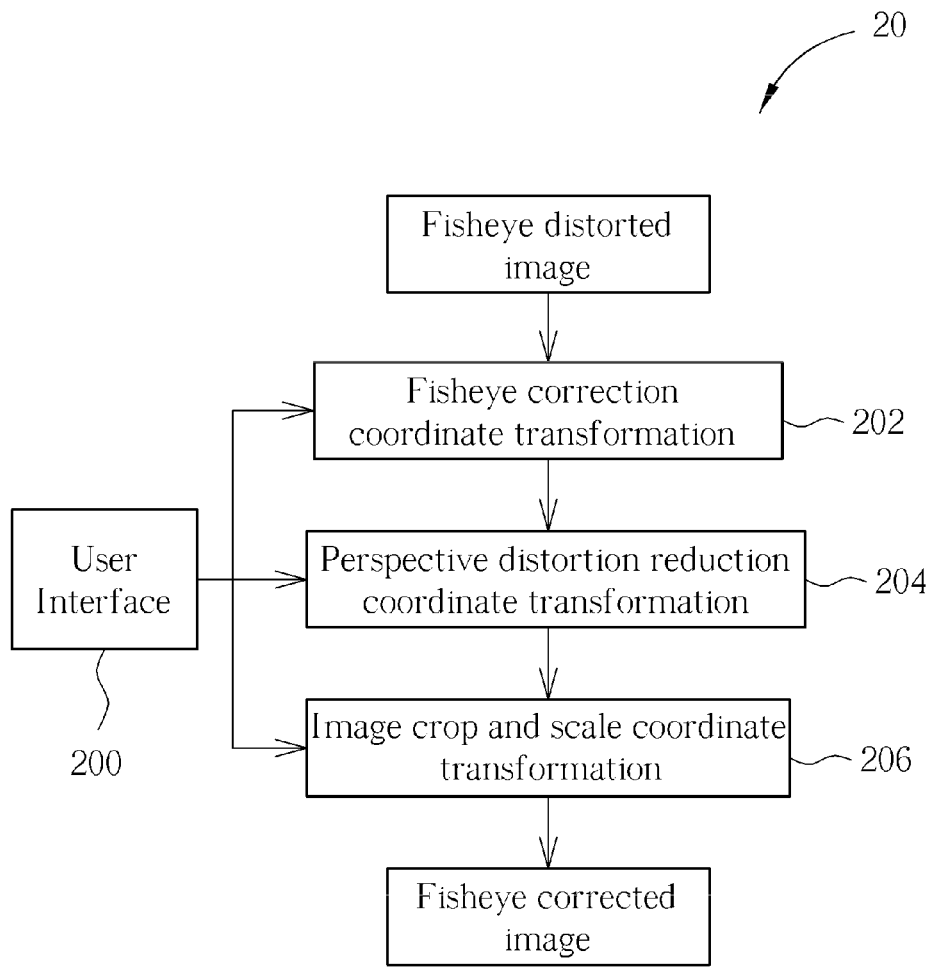
FIG. 2A illustrates a schematic diagram of the coordinate transformation used in step 102.
Figure 2B:
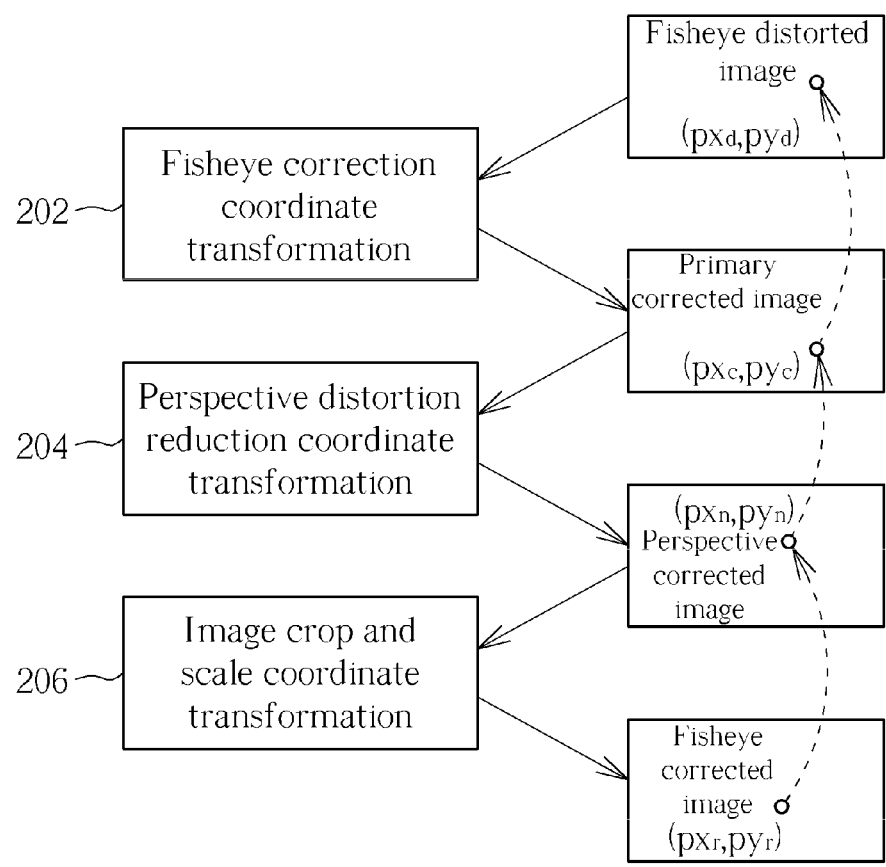
FIG. 2B illustrates a schematic diagram of the coordinate transformations used for transforming the fisheye distorted image and the related images used in step 102.

To detail further the operations of process 10, please refer to FIG. 1. In step 102, in order to save memory space during the image processing procedure, the present invention reversely calculates the corresponding coordinate of a pixel of the fisheye corrected image in the fisheye distorted image. Please continue to refer to FIG. 2A, which illustrates a schematic diagram of the coordinate transformation used in step 102. The coordinate transformation further comprises the fisheye correction coordinate transformation 202, the perspective distortion reduction coordinate transformation 204 and the image crop and scale coordinate transformation 206. Conceptually, in order to restore the image, the fisheye distorted image must go through the fisheye correction coordinate transformation 202, the perspective distortion reduction coordinate transformation 204 and the image crop and scale coordinate transformation 206 in sequence. But, according to the present invention, the searching sequence of coordinate transformation are reversed to find the corresponding coordinate in the fisheye distorted image starting from the fisheye corrected image, as illustrated in FIG. 2B. FIG. 2B illustrates a schematic diagram of the coordinate transformations used for transforming the fisheye distorted image and the related images. On the other hand, the present invention also comprises a user interface 200 which can be used by a user to change the values of the parameters used in the image restoring process to satisfy individual needs.

Please again refer to FIG. 2B, the step 102 used in FIG. 2B shows that the fisheye correction coordinate transformation 202 is being used for transforming the fisheye distorted image into a primary corrected image, after the fisheye distorted image is detected. The perspective distortion reduction coordinate transformation 204 is then used for transforming the primary corrected image to the perspective corrected image and the image crop and scale coordinate transformation 206 is used for transforming the perspective corrected image to the fisheye corrected image. Step 102 takes the coordinate ($px_r$, $py_r$) of a pixel in the fisheye corrected image, and finds the corresponding coordinate ($px_n$, $py_n$) in the perspective corrected image, and then finds the coordinate ($px_c$, $py_c$) in the primary corrected image, and finally gets the coordinate ($px_d$, $py_d$) in the fisheye distorted image. Secondly, according to step 104, based on the calculated coordinate ($px_d$, $py_d$) in the fisheye distorted image, process 10 applies an interpolation method to estimate the pixel value. By following the same procedure pixel by pixel, every pixel value in the fisheye corrected image can be acquired. Therefore, through the reverse computational method of the present invention, the coordinate corresponding to the fisheye corrected image in the fisheye distorted image can be found, and the pixel value can be estimated by an interpolation method, and the fisheye image restoration can be realized.

Figure 3:
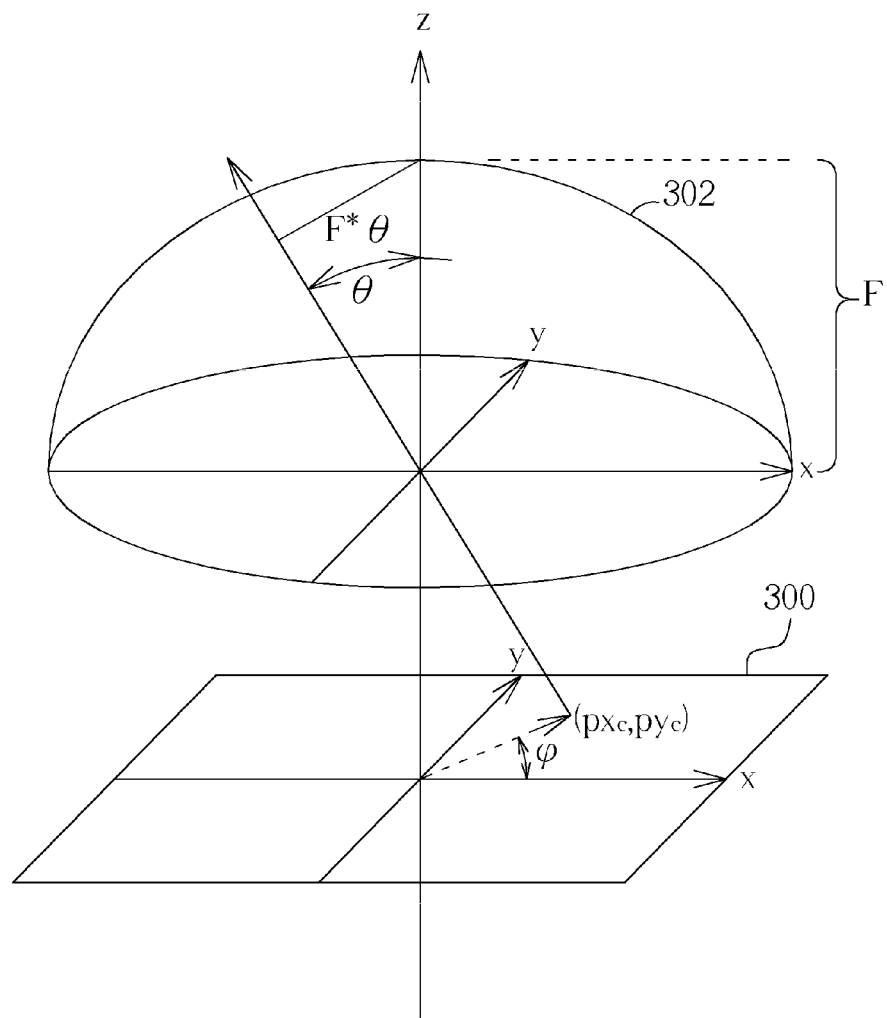
FIG. 3 illustrates a schematic diagram of relationship between a fisheye distorted image and a planar image sensor.

To explain further the fisheye correction coordinate transformation 202, please refer to FIG. 3, which illustrates a schematic diagram of relationship between a fisheye distorted image and a planar image sensor. Generally, a fisheye distorted image collects image information from a very wide view angle. More specifically, the fisheye distorted image covers a hemisphere of viewing angle (the view angles in both the horizontal and vertical directions can be about 180 degrees), and this wide view angle of incident lights are to be projected onto and collected by a relatively small size of planar image sensing device. To address it further, the coordinate transformation between the image sensor 300 and the hemisphere 302, which illustrates the light emanating from the object space of the fisheye lens, and are incident on the imaging device, can be expressed as the following equations:

$$r = \sqrt{px_c^2 + py_c^2}$$

$$\phi = a\tan 2(py_c/px_c)$$

$$\theta = a\tan(r/F)$$

$$\text{Radius} = F*\theta$$

$$px_d = \text{Radius}*\cos(\phi)$$

$$py_d = \text{Radius}*\sin(\phi)$$

Wherein the coordinate ($px_c$, $py_c$) represents the two dimensional coordinates in the primary corrected image, r represents the distance between the origin and image point ($px_c$, $py_c$) in the primary corrected image. The parameter Radius represents the distance between the origin and image point ($px_d$, $py_d$) in the fisheye distorted image. And, F represents the focal length of the fisheye lens. Two popular arctangent functions atan( ) and atan2( ) are used for deciding the values of angles $\theta$ and $\phi$.

Figure 4A:
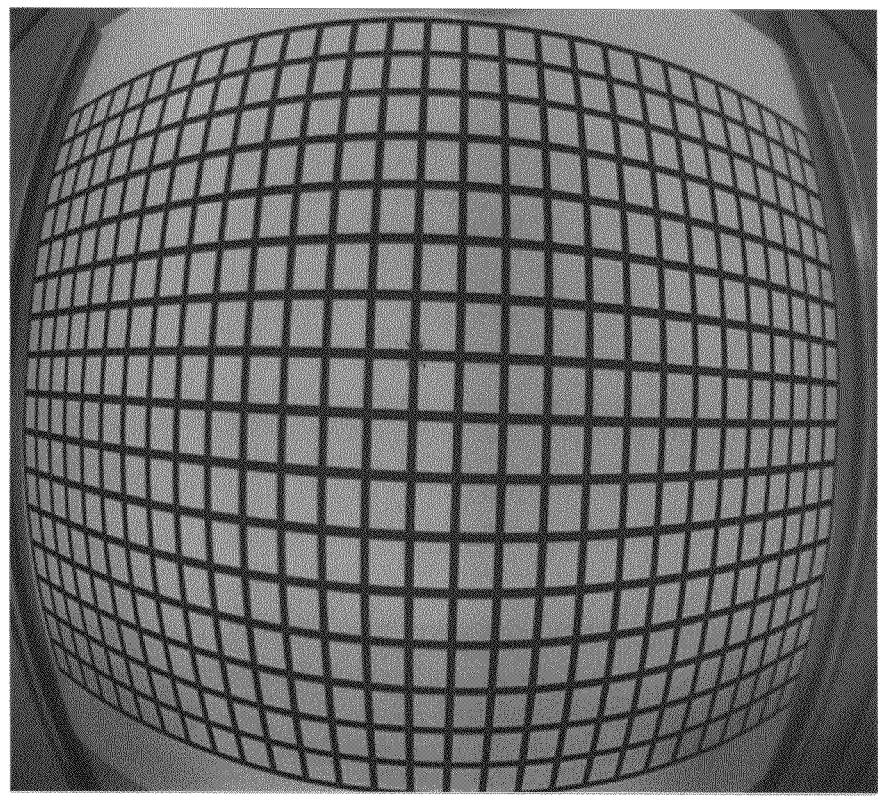
FIG. 4A illustrates an image taken by an image device using fisheye lens.

From the formulae stated above, the coordinate transformation can be performed between the coordinate ($px_d$, $py_d$) in the fisheye distorted image and the coordinate ($px_c$, $py_c$) in the primary corrected image, and this coordinate transformation is mainly used to restore and "straighten" the image distorted and squeezed by the fisheye lens. To demonstrate the effect of the coordinate transformation, please refer to FIGS. 4A and 4B. FIG. 4A illustrates a fisheye taken by a image device using a fisheye lens, and FIG. 4B illustrates an image after processing by a fisheye correction coordinate transformation.

Figure 4B:
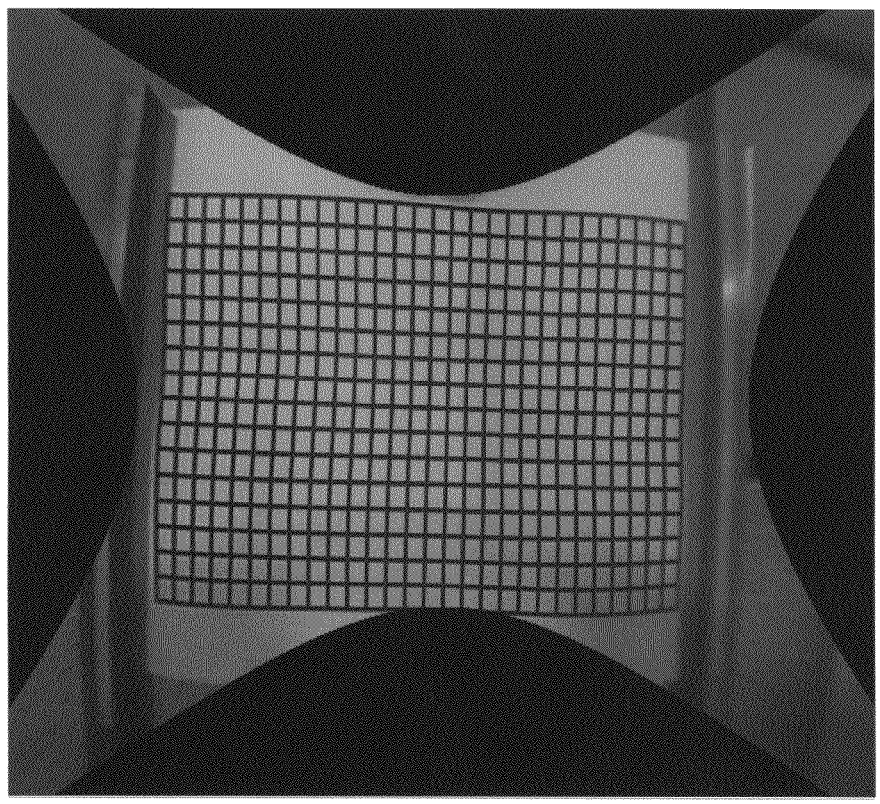
FIG. 4B illustrates an image after processed by a fisheye correction coordinate transformation.

Please continue to refer to FIG. 4B, the fisheye correction coordinate transformation 202 is followed by an image cropping process. The purpose of the image cropping process is to crop a rectangular image, such that the image can be conveniently displayed in a usual display monitor with a rectangular screen. FIG. 4B illustrates the rectangular cropping area after the fisheye correction coordinate transformation 202.

Figure 4C:
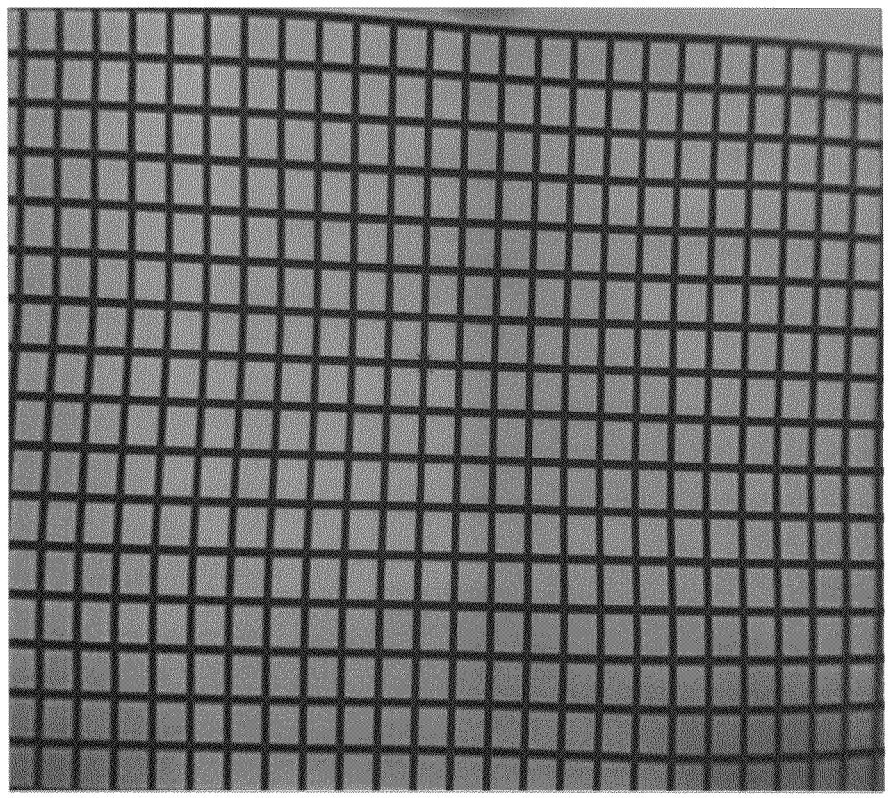
FIG. 4C illustrates an image after processing by an image cropping process.

FIG. 4C illustrates an image after processing by a image cropping process. The present invention further comprises an image scaling process to change the aspect ratio of the cropped image to fit the display monitor's aspect ratio, and will be detailed further below. Consequently, according to the present invention, the fisheye distorted image can be restored by an image processing procedure, the squeezed image taken by the fisheye image device can be "straightened", and the restored image can be displayed according to the desired aspect ratio.

The present invention also discloses a perspective distortion reduction coordinate transformation 204 for reducing the perspective distortion. After the fisheye distorted image is transformed into the primary corrected image, the perspective distortion reduction coordinate transformation 204 can apply to the primary corrected image to gradually increase the compression ratio from the center to the boundary of the image, such that the perspective distortion can be reduced. In other words, the part close to the center of the image will experience only minor compression, but the part close to the boundary of the image will be compressed with a greater ratio. Preferably, the perspective distortion reduction coordinate transformation 204 is a two-dimensional nonlinear transformation, and can be stated as the following equations:

$$px_n = px_c * (1 - \sigma_x * px_c * px_c)$$

$$py_n = py_c * (1 - \sigma_y * py_c * py_c)$$

Figure 5A:
FIG. 5A illustrates a primary corrected image before performing the process of perspective distortion reduction.
Figure 5B:
FIG. 5B illustrates an image after performing the process of perspective distortion reduction.

The two dimensional coordinate ($px_c, py_c$) is in the primary corrected image, and the two dimensional coordinate ($px_n, py_n$) is in the perspective corrected image after the nonlinear coordinate transformation stated above. Parameters $\sigma_x$ and $\sigma_y$ are the compensating parameters used for controlling the degree of compression in the horizontal and vertical direction. The perspective distortion reduction coordinate transformation 204 is used for regulating the size of the objects which are close to the boundary of the image, such that the uniformity of the size of objects in the whole fisheye corrected image can be further assured. By adding this perspective distortion reduction process, it is more convenient for the user to correctly extract useful information from the corrected image. On the other hand, the parameters $\sigma_x$ and $\sigma_y$ included in the nonlinear coordinate transformation equations can be set to some properly predefined values, or can be modified according to the user's request through the user interface 200. Consequently, the parameters $\sigma_x$ and $\sigma_y$ can be regulated by the user to meet individual preferences to help correctly interpret the contents in the corrected image. About the effects of the perspective distortion reduction coordinate transformation 204, please refer to FIGS. 5A and 5B. FIG. 5A illustrates a primary corrected image before performing the process of perspective distortion reduction, and FIG. 5B illustrates an image after performing the process of perspective distortion reduction. To make a comparison, inside FIG. 5B, the objects close to the boundary of the image are further compressed by the nonlinear transformation to improve the uniformity in size among the objects within the whole corrected image.

Figure 6A:
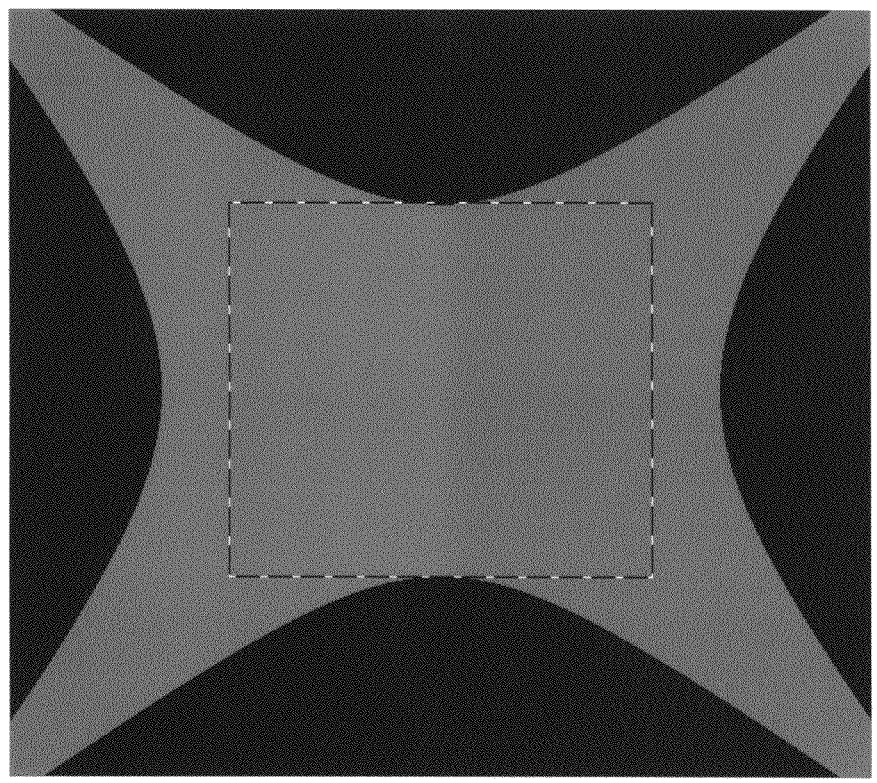
FIG. 6A illustrates an image cropping method without maximally keeping the image information.
Figure 6B:
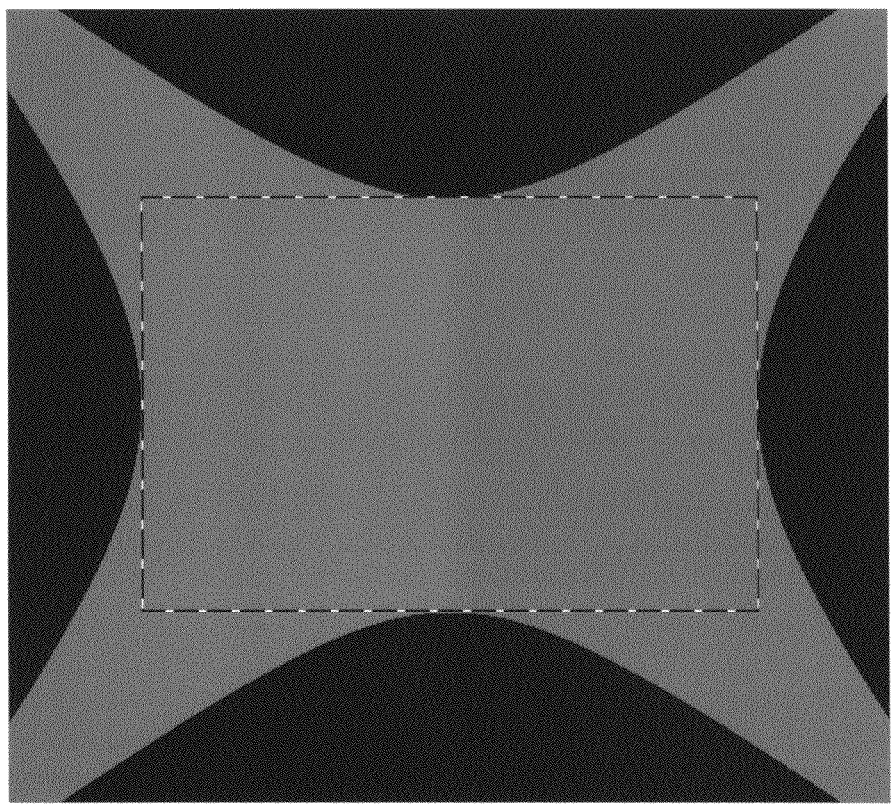
FIG. 6B illustrates an image cropping method of the present invention which maximally keeps the image information.

On the other hand, the present invention applies an image cropping method which can maximally keep the information included in the image. Please refer to FIGS. 6A and 6B, FIG. 6A illustrates an image cropping method without maximally keeping the image information, and FIG. 6B illustrates an image cropping method of the present invention which maximally keeps the image information. The cropping method of the present invention crops the image in a rectangle such that the rectangle exerts the utmost efforts to include the image information, both horizontally and vertically. Most likely, the aspect ratio of the rectangle used by the present invention will not be equal to the aspect ratio of the display monitor; To solve this issue, according to the present invention, the image crop and scale coordinate transformation 206 can include an image scaling function to rescale the rectangle, such that the aspect ratio of the rectangle equals the aspect ratio of the display monitor, and still keep the image information at a maximal level.

Furthermore, according to step 104, corresponding to a coordinate value in the fisheye corrected image, finding its counterparts coordinate value in the fisheye distorted image will go through the reverse computational process including the image crop and scale coordinate transformation 206, the perspective distortion reduction coordinate transformation 204 and the fisheye correction coordinate transformation 202. The calculated coordinate value is not likely to locate just upon a specific pixel in the fisheye distorted image. To calculate the pixel value which corresponds to the calculated coordinate value, the present invention uses an interpolation method. The said interpolation method calculates the weighted averages of the surrounding pixels, which is centered on the calculated coordinate value, to get an image estimation value, and assign the image estimation value as the pixel value of the fisheye corrected image.

Figure 7A:
FIG. 7A illustrates an example of a fisheye distorted image before performing the process of the present invention.
Figure 7B:
FIG. 7B illustrates an example of a fisheye corrected image after performing the process of the present invention.

To illustrate the total effects of the fisheye correction coordinate transformation 202, the perspective distortion reduction coordinate transformation 204 and the image crop and scale coordinate transformation 206 of the present invention, please refer to FIGS. 7A and 7B. FIG. 7A illustrates an example of fisheye distorted image before performing the process of the present invention, and FIG. 7B illustrates an example of fisheye corrected image after performing the process of the present invention.

Noticeably, if the coordinate transformation is not performed in a one pass fashion as stated in the present invention, and instead the coordinate transformations are performed in a sequence of the fisheye correction coordinate transformation 202, the perspective distortion reduction coordinate transformation 204 and the image crop and scale coordinate transformation 206, respectively, then a considerable memory space should be arranged and provided for storing the temporary execution results. As a result, a huge memory space is required by the system which is not using the one pass method, and the total cost for realizing the image processing system will be undoubtedly increased. The present invention saves the memory space required in the computation process by using a reverse computational method: firstly, for every pixel in the fisheye corrected image, find its corresponding pixel's coordinate in the fisheye distorted image, and then based on the coordinate in the fisheye distorted image, directly calculates an image estimation value for the pixel in the fisheye corrected image, and the whole process completes without extra demand for memory space to store the intermediate execution results.

Figure 8:
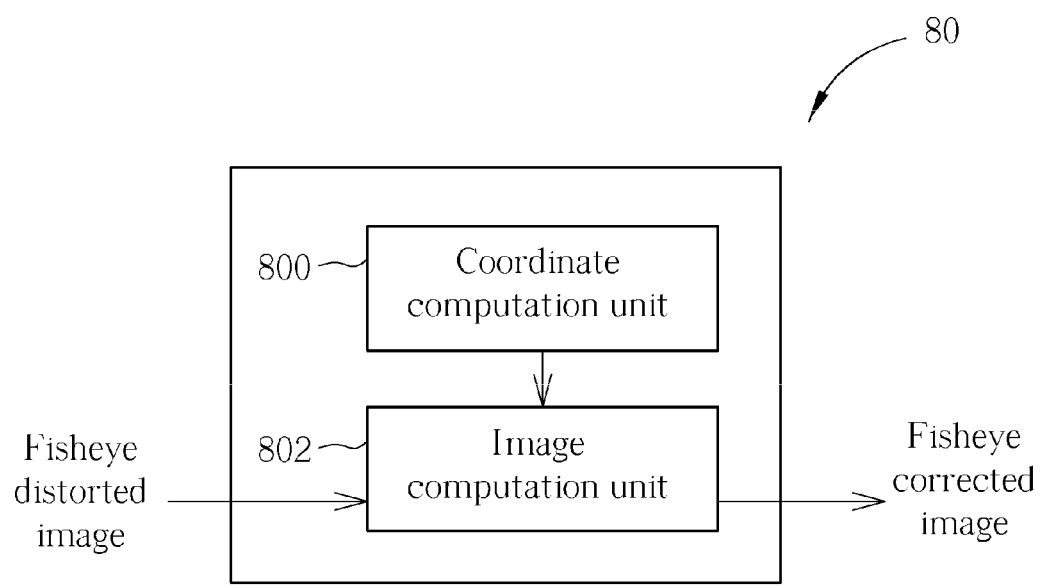
FIG. 8 illustrates a schematic diagram of a fisheye image processor of the present invention.

About the realization method of flowchart 10, please refer to FIG. 8, which illustrates a schematic diagram of a fisheye image processor 80 of the present invention. The fisheye image processor 80, being used for saving memory space, comprises a coordinate computation unit 800, and an image computation unit 802. The coordinate computation method 800 can take the coordinate of any pixel in the fisheye corrected image, find its corresponding pixel's coordinate in the fisheye distorted image, by a reverse computational method, and output to the image computation unit 802. As mentioned before, the coordinate transformations involved in the reverse computational method comprises a fisheye correction coordinate transformation 202, a perspective distortion reduction coordinate transformation 204 and an image crop and scale coordinate transformation 206. The image computation unit 802 uses the coordinate output from the image computation unit 800, and comprises an interpolation algorithm to estimate the pixel's value, which corresponds to the original pixel in the fisheye corrected image. The interpolation method used by the image computation unit 802 is to take the pixel values from the surrounding pixels centered on the coordinate output by the coordinate computation unit 800, and then generate the pixel value by calculating the weighted average of the surrounding pixel. The fisheye image processor 80 is to realize flowchart 10, the information involved in the computation procedure has been stated in the preceding paragraphs, and won't be detailed further.

Noteworthily, the present invention uses a reverse computational method: for every pixel in the fisheye corrected image to find its corresponding pixel's coordinate in the fisheye distorted image. Based on the coordinate in the fisheye distorted image, the present invention directly calculates an image estimation value for the pixel in the fisheye corrected image. Consequently, the memory buffer space can be saved. Preferably, the process used for calculating the two-dimensional coordinates of the pixels in the fisheye corrected image, using a reverse "searching" method to find their counterparts' coordinates in the fisheye distorted image is executed in real time on the coordinate computation unit 800, and the image estimation values are executed in real time on the image computation unit 802, Briefly speaking, according to the present invention, for adapting users' different habits in interpreting images, the compensating parameters, which are included in the two-dimensional nonlinear coordinate transformation function associated with the perspective distortion reduction coordinate transformation 204, can be a predefined value or can be controlled by a user via a simple user interface, preferably, via a graphical user interface, to increase or decrease the compensating values. The purpose is for the user to directly regulate the compensating parameters in the nonlinear equations to help the user correctly interpreting the fisheye corrected image. After detecting the fisheye distorted image, the user can easily change the parameters via the graphical user interface, instead of doing expensive and complicated calibrating works in a laboratory environment to correct fisheye distorted image. Also, the size of the corrected image can be varied and specified by a user and, in this case, the image crop and scale coordinate transformation can be used accordingly.

To sum up, the present invention uses an algorithm and a digital image processor to implement the algorithm doing reverse searching for the two-dimensional coordinate of any virtual pixel of the virtual fisheye corrected image by calculating the coordinate of the corresponding pixel in the fisheye distorted image, such that the memory space required by the prior art for storing the intermediate result can no longer be required. The computation efficacy is greatly improved, and the purpose for implementing a digital image processing system of less cost can be fulfilled. Meanwhile, the present invention allows the user's intervention to regulate the compensating parameters, such that the fisheye distortion can be reduced according to users' personal preference, and eventually the users' convenience can be improved.

Those skilled in the art will readily observe that numerous modifications and alterations of the device and method may be made while retaining the teachings of the invention.

What is claimed is:

1. A fisheye correction with perspective distortion reduction method used for saving memory space and reducing perspective distortion, comprises:

calculating a coordinate for each pixel of a first plurality of pixels in a fisheye distorted image according to a coordinate transformation function between the fisheye distorted image and a fisheye corrected image, which comprises a second plurality of pixels; and calculating a pixel value of the pixels in the fisheye corrected image via an interpolation method according to the coordinate in the fisheye distorted image;

wherein the coordinate transformation function includes a fisheye correction coordinate transformation, a perspective distortion reduction coordinate transformation and an image crop and scale coordinate transformation, and the coordinate transformation function is performed in a one-pass fashion by combining the fisheye correction coordinate transformation, the perspective distortion reduction coordinate transformation and the image crop and scale coordinate transformation into the single coordinate transformation function, and the perspective distortion reduction coordinate transformation comprises following equations:

$$px_n = px_c*(1-\sigma_x*px_c*px_c)$$

$$py_n = py_c*(1-\sigma_y*px_c*px_c)$$

wherein a two dimensional coordinate $(px_c, py_c)$ is before the perspective distortion reduction coordinate transformation, a two dimensional coordinate $(px_n, py_n)$ is after the perspective distortion reduction coordinate transformation, and parameters $\sigma_x$ and $\sigma_y$ are compensating parameters used for controlling degrees of compression in a horizontal and a vertical direction.

2. The method of claim 1, wherein calculating the coordinate for each pixel of the first plurality of pixels in the fisheye distorted image according to the coordinate transformation function between the fisheye distorted image and the fisheye corrected image, which comprises the second plurality of pixels, is to calculate the coordinate in the fisheye distorted image corresponding to a selected pixel in the fisheye corrected image by performing the fisheye correction coordinate transformation, the perspective distortion reduction coordinate transformation and the image crop and scale coordinate transformation.

3. The method of claim 1, wherein calculating the pixel value of the pixel in the fisheye corrected image via the interpolation method according to the coordinate in the fisheye distorted image is to calculate an image estimation value of a selected pixel in the fisheye corrected image by the interpolation method, which calculates a weighted sum of a third plurality of pixels in the neighborhood of the coordinate in the fisheye distorted image.

4. The method of claim 1, wherein the perspective distortion reduction coordinate transformation is performed according to a set of nonlinear equations doing perspective distortion reduction by varying compression ratios.

5. The method of claim 4, wherein a plurality of compensating parameters comprised in the set of nonlinear equations doing perspective distortion reduction are a plurality of predefined values.

6. The method of claim 4, wherein a plurality of compensating parameters comprised in the set of nonlinear equations doing perspective distortion reduction are a plurality of values input by a user.

7. A fisheye correction with perspective distortion reduction fisheye image processing device used for saving memory space and reducing perspective distortion, comprises:

a coordinate computation unit comprising a first processor for executing a first program code and a first memory storing the first program code, wherein the first program code comprises calculating a coordinate for each pixel of a first plurality of pixels in a fisheye distorted image according to a coordinate transformation function between the fisheye distorted image and a fisheye corrected image, which comprises a second plurality of pixels; and an image computation unit comprising a second processor for executing a second program code and a second memory storing the second program code, wherein the second program code comprises calculating a pixel value of the pixel in the fisheye corrected image via an interpolation method according to the coordinate in the fisheye distorted image;

wherein the first processor and the second processor are a same processor or different processors;

wherein the coordinate transformation function includes a fisheye correction coordinate transformation, a perspective distortion reduction coordinate transformation and an image crop and scale coordinate transformation, and the coordinate transformation function is performed in a one-pass fashion by combining the fisheye correction coordinate transformation, the perspective distortion reduction coordinate transformation and the image crop and scale coordinate transformation into the single coordinate transformation function, and the perspective distortion reduction coordinate transformation comprises following equations:

$$px_n = px_c * (1 - \sigma_x * px_c * px_c)$$

$$py_n = py_c * (1 - \sigma_y * px_c * px_c)$$

wherein a two dimensional coordinate $(px_c, py_c)$ is before the perspective distortion reduction coordinate transformation, a two dimensional coordinate $(px_n, py_n)$ is after the perspective distortion reduction coordinate transformation, and parameters $\sigma_x$ and $\sigma_y$ are compensating parameters used for controlling degrees of compression in a horizontal and a vertical direction.

8. The device of claim 7, wherein the first program code further comprises calculating the coordinate in the fisheye distorted image for a selected pixel in the fisheye corrected image by performing the fisheye correction coordinate transformation, the perspective distortion reduction coordinate transformation and the image crop and scale coordinate transformation.

9. The device of claim 7, wherein the second program code further comprises calculating an image estimation value of a selected pixel in the fisheye corrected image by an interpolation method, which calculates a weighted sum of a third plurality of pixels in the neighborhood of the coordinate in the fisheye distorted image.

10. The device of claim 7, wherein the perspective distortion reduction coordinate transformation is performed according to a set of nonlinear equations doing perspective distortion reduction by varying compression ratios.

11. The device of claim 10, wherein a plurality of compensating parameters comprised in the set of nonlinear equations doing perspective distortion reduction are a plurality of predefined values.

12. The device of claim 10, wherein a plurality of compensating parameters comprised in the set of nonlinear equations doing perspective distortion reduction are a plurality of values input by a user.

* * * * *